United States Patent
Ao

(10) Patent No.: US 11,951,488 B2
(45) Date of Patent: Apr. 9, 2024

(54) AXIAL FLOW CYCLONE COALESCENCE AIR-FILTRATION METHOD AND APPARATUS

(71) Applicant: BEIJING COMFORT TECHNOLOGIES CO., LTD., Beijing (CN)

(72) Inventor: Jacques Ao, Beijing (CN)

(73) Assignee: BEIJING COMFORT TECHNOLOGIES CO., LTD., Beijing (CN)

( * ) Notice: Subject to any disclaimer, the term of this patent is extended or adjusted under 35 U.S.C. 154(b) by 164 days.

(21) Appl. No.: 17/593,377

(22) PCT Filed: Apr. 9, 2019

(86) PCT No.: PCT/CN2019/081843
§ 371 (c)(1),
(2) Date: Oct. 26, 2021

(87) PCT Pub. No.: WO2020/186576
PCT Pub. Date: Sep. 24, 2020

(65) Prior Publication Data
US 2022/0168756 A1     Jun. 2, 2022

(30) Foreign Application Priority Data
Mar. 21, 2019 (CN) .......................... 201910219341.0

(51) Int. Cl.
*B04C 5/13* (2006.01)
*B04C 9/00* (2006.01)
*F24F 8/30* (2021.01)

(52) U.S. Cl.
CPC .................. *B04C 5/13* (2013.01); *B04C 9/00* (2013.01); *F24F 8/30* (2021.01); *B04C 2009/001* (2013.01)

(58) Field of Classification Search
CPC ....... B04C 5/13; B04C 9/00; B04C 2009/001; B04C 3/06; B04C 3/04; F24F 8/30;
(Continued)

(56) References Cited

U.S. PATENT DOCUMENTS 4,231,766 A * 11/1980 Spurgin .................... B03C 3/36
361/230
4,588,423 A * 5/1986 Gillingham ............... B03C 3/15
60/275

(Continued)

FOREIGN PATENT DOCUMENTS

CN    104741253 A * 7/2015
CN    106362880 A * 2/2017 ............... B03C 3/40

*Primary Examiner* — Dung H Bui
(74) *Attorney, Agent, or Firm* — Bayramoglu Law Offices LLC

(57) ABSTRACT

An axial cyclone air filtration apparatus integrated with a bipolar-charged agglomeration includes a pre-charge region and an axial cyclone coagulation dust separation apparatus, and the pre-charge region is arranged on an air inlet side of the axial cyclone coagulation dust separation apparatus. Suspended particles in air are charged with charges of different polarities in the pre-charge region before entering the axial cyclone coagulation dust separation apparatus. The organic combination of electric coagulation technology and axial cyclone dust separation technology improves the filtering efficiency for ultra-fine particles in air.

4 Claims, 3 Drawing Sheets

(58) Field of Classification Search
CPC ........ B01D 46/00; B01D 50/00; B01D 53/32; B01D 2257/708; B03C 3/01; B03C 3/0175; B03C 3/08; B03C 3/12; B03C 3/15; B03C 3/368; B03C 3/41; B03C 3/47

See application file for complete search history.

(56) References Cited

U.S. PATENT DOCUMENTS

| | | | | | |
|---|---|---|---|---|---|
| 5,302,190 | A * | 4/1994 | Williams | ............. | B03C 3/12 95/79 |
| 5,695,549 | A * | 12/1997 | Feldman | ............. | B03C 3/66 95/80 |
| 6,004,376 | A * | 12/1999 | Frank | ............. | B03C 3/38 95/79 |
| 9,757,736 | B2 * | 9/2017 | Vanella | ............. | A61L 9/20 |
| 9,943,859 | B2 * | 4/2018 | Prasad | ............. | B03C 3/0175 |
| 10,913,073 | B2 * | 2/2021 | John | ............. | B03C 3/366 |
| 2004/0025481 | A1 * | 2/2004 | Bugli | ............. | B01D 45/16 55/455 |
| 2005/0083633 | A1 * | 4/2005 | Riebel | ............. | H01T 23/00 361/227 |
| 2006/0278081 | A1 * | 12/2006 | Han | ............. | A47L 9/1641 15/352 |
| 2007/0144117 | A1 * | 6/2007 | Park | ............. | B04C 5/26 55/345 |
| 2010/0251889 | A1 * | 10/2010 | Haruna | ............. | B03C 3/41 95/79 |
| 2012/0067214 | A1 * | 3/2012 | Ribera Salcedo | ............. | B03C 3/49 96/57 |
| 2012/0124969 | A1 * | 5/2012 | Nagasawa | ............. | B03C 3/12 60/275 |
| 2013/0327002 | A1 * | 12/2013 | Ackermann | ............. | B04C 3/00 55/327 |
| 2015/0090120 | A1 * | 4/2015 | Au | ............. | B03C 9/00 95/70 |
| 2015/0182975 | A1 * | 7/2015 | Matsuura | ............. | B03C 3/78 95/8 |
| 2015/0198090 | A1 * | 7/2015 | Howe | ............. | F02C 7/052 60/39.092 |
| 2015/0265740 | A1 * | 9/2015 | Ui | ............. | B01D 53/323 422/121 |
| 2015/0328571 | A1 * | 11/2015 | Son | ............. | B04C 3/06 55/418 |
| 2016/0265435 | A1 * | 9/2016 | Snyder | ............. | F02C 7/05 |
| 2017/0007958 | A1 * | 1/2017 | Ui | ............. | B01D 53/8668 |
| 2017/0138263 | A1 * | 5/2017 | Duge | ............. | B64D 33/02 |
| 2017/0333918 | A1 * | 11/2017 | Hua | ............. | B01D 45/12 |
| 2018/0126389 | A1 * | 5/2018 | Lefsrud | ............. | B01D 45/16 |
| 2018/0193848 | A1 * | 7/2018 | John | ............. | B03C 3/361 |
| 2018/0200728 | A1 * | 7/2018 | Pourprix | ............. | B03C 3/49 |
| 2019/0381516 | A1 * | 12/2019 | Marra | ............. | B03C 3/368 |
| 2022/0168756 | A1 * | 6/2022 | Ao | ............. | B04C 9/00 |

* cited by examiner

AXIAL FLOW CYCLONE COALESCENCE AIR-FILTRATION METHOD AND APPARATUS

CROSS REFERENCE TO THE RELATED APPLICATIONS

This application is the national phase entry of International Application No. PCT/CN2019/081843, filed on Apr. 9, 2019, which is based upon and claims priority to Chinese Patent Application No. 201910219341.0, filed on Mar. 21, 2019, the entire contents of which are incorporated herein by reference.

TECHNICAL FIELD

The present invention relates to the technical field of air purification, and more particularly, to an axial cyclone air filtration method and apparatus integrated with a bipolar-charged agglomeration.

BACKGROUND

It is important to remove particles in the air and make the air cleaner in ventilation and air conditioning systems, air purification systems, industrial dust removal systems, oil fume purification systems, welding smoke purification systems, painting mist purification systems, and other fields.

In order to solve the problem that the conventional air filter and the bag dust collector requires frequent replacement after running for a specified time period, as well as the inconvenience of cleaning and maintenance of a double-zone electrostatic precipitator, the inventor once invented an axial-flow cyclone dust separation apparatus, with patent number: ZL 2015101739354. Specifically, the axial-flow cyclone dust separation apparatus removes suspended particles in air by centrifugal force. It has the advantages of constant operation pressure drop and is maintenance-free. After several years of operation practice, the axial-flow cyclone dust separation apparatus has a good filtration effect on the particles with a particle size of more than 5.0 μm, but has little effect on the ultra-fine suspended particles, such as PM2.5, while such ultra-fine respirable suspended particles in air are more harmful to the human body. The situations where air is polluted by the ultra-fine particles can be found everywhere in our daily life and work, such as haze weather, sandstorm weather, welding workshops, paint workshops, coal-fired boiler flue gas emissions, kitchen oil fume emissions, etc. Therefore, it has a great market prospect to develop an air-filtration apparatus, which can not only remove the ultra-fine particles suspended in the air, but also has maintenance-free capabilities and low energy consumption.

For the filtration of ultra-fine respirable particles from flue gas emissions, electric coagulation technology has been widely used in the flue gas purification system of coal-fired boilers. The usual practice is as follows: the dusty air flow first passes through the bipolar charging field, and the particles in the gas are charged with charges of different polarities; then the bipolar-charged particles are coagulated into large particles in the next-stage alternating electric field, which is called the electric coagulation technology; finally, the coagulated large particles enter the dust collection apparatus such as electrostatic precipitator and bag dust filtration apparatus, and achieve the function of air filtration and purification. The dust filtration system made according to this technical solution requires large installation space, high initial investment, high energy consumption, and large workload of operation and maintenance.

SUMMARY

In view of the shortcomings of the above background technology, the present invention provides an axial cyclone air filtration method and apparatus integrated with a bipolar-charged agglomeration, which has the advantage of improving the filtering efficiency for particles with particle size 5.0 μm, so as to solve the problems raised by the background technology.

The present invention adopts the following technical solutions. An axial cyclone air filtration apparatus integrated with a bipolar-charged agglomeration includes a pre-charge region and an axial cyclone coagulation dust separation apparatus, and the pre-charge region is arranged on an air inlet side of the axial cyclone coagulation dust separation apparatus.

Preferably, the pre-charge region includes a positive and negative ion generator, and the positive and negative ion generator includes a power supply, a positive corona electrode, a negative corona electrode, and a grounding plate. The positive corona electrode and the negative corona electrode are alternately arranged on both sides of the grounding plate to form a positive corona area and a negative corona area adjacent to each other.

Preferably, the axial cyclone coagulation dust separation apparatus includes an air inlet, a guide vane, a flow deflector, an outer cylinder, an air outlet, and a dust collection channel. The inner diameter of the air outlet is less than the inner diameter of the outer cylinder. The air outlet includes the inner cavity of the air outlet and the outer-wall cavity of the air outlet, where the outer-wall cavity of the air outlet is formed by the dust collection channel.

Preferably, a plurality of single cylinders of the axial cyclone coagulation dust separation apparatus can be modularly arrayed and assembled according to the volume of the air flow to be treated to form an axial cyclone coagulation dust separation function section in air handling system.

Preferably, a V-shaped guide plate is respectively arranged on an air outlet side of the positive corona area, an air outlet side of the negative corona area, and the air inlet side of the axial cyclone coagulation dust separation apparatus.

An axial cyclone air filtration method integrated with a bipolar-charged agglomeration includes the following operation steps:
step 1: under an action of a driving force of an external fan, allowing a dusty air flow to first pass through a pre-charge region, then allowing particles in the dusty air flow to be positively charged and negatively charged respectively after colliding with positive and negative ions in electric fields of a positive corona area and a negative corona area adjacent to each other, i.e., suspended particles in the dusty air flow are bipolarly charged during the pre-charge region;
step 2: allowing positively charged particles and negatively charged particles to flow into an axial cyclone coagulation dust separation apparatus, and to be mixed, compressed, collided and rotated at the guide vane and an annular cavity formed by the outer cylinder and the flow deflector, where the positively charged particles and the negatively charged particles are agglomerated into large particles under an action of a centrifugal force and a coulomb force;

step 3: allowing a large number of ultra-fine particles to be adsorbed on the large particles in a coagulation process, allowing agglomerated particles to form an annular dust layer moving forward spirally along an inner wall of the outer cylinder under a double action of the centrifugal force and an inertia force; allowing particles in the annular dust layer to be tightly bonded together due to the coulomb force and an electric polarization effect, and allowing the annular dust layer to move forward under an action of the inertia force and to fall into a dust collection channel after hitting a tail of an outer-wall cavity of an air outlet, and discharging clean air from an inner cavity of the air outlet, so as to realize an air-filtration function. For some special application situations, such as a presence of flammable and explosive gases or particles with large viscosity (such as painting mist) in the dusty air flow, in order to prevent combustion and explosion accidents caused by discharge and spark of an corona electrode, or to protect the corona electrode itself, a positive and negative ion generator of the pre-charge region is installed outside a main duct of the dusty air flow, and the positive and negative ion generator is further installed on an air inlet side of the axial cyclone coagulation dust separation apparatus. Under an action of the fan, compressed air or other external force, the positive and negative ions produced by the positive and negative ion generator are injected into the main duct of the dusty air flow together with indoor air (or outdoor fresh air) and collide with particles in the dusty air flow, so that the positively charged particles and the negatively charged particles, i.e., bipolar-charged particles, are formed before entering the axial cyclone coagulation dust separation apparatus to further improve filtration of air.

The present invention has the following advantages.

1. The axial cyclone air filtration method and apparatus integrated with the bipolar-charged agglomeration achieve the organic combination of electric coagulation technology and axial cyclone dust separation technology, and the dual functions of particle coagulation and dust centrifugal separation are realized simultaneously in the axial cyclone apparatus. Since the coagulation function is realized inside the axial cyclone apparatus, the filtering efficiency of the present invention for ultra-fine particles is much higher than that of the traditional axial cyclone separator.

2. According to the axial cyclone air filtration method and apparatus, huge energy is released at the moment when positive and negative ions conduct the neutralization of the positive and negative charges in the axial cyclone dust separation apparatus, making bacterial DNA structure to break, so as to realize the role of air sterilization. In addition, total volatile organic compound (TVOC) such as formaldehyde/benzene/ammonia, etc. and other gaseous organic volatiles can be effective decomposed, thereby eliminating odor and further improving air purification effect.

In the figures: 1, pre-charge region; 2, axial cyclone coagulation dust separation apparatus; 3, axial cyclone coagulation dust separation function section; 4, V-shaped guide plate; 5, power supply; 6, positive corona electrode; 7, negative corona electrode; 8, grounding plate; 9, positive corona area; 10, negative corona area; 11, air inlet; 12, guide vane; 13, flow deflector; 14, outer cylinder; 15, annular dust layer; 16, air outlet; 17, outer-wall cavity of the air outlet; 18, inner cavity of the air outlet; 19, dust collection channel; 20, fan; 21, indoor air; 22, positively charged particle; 23, negatively charged particle.

DETAILED DESCRIPTION OF THE EMBODIMENTS

The technical solutions in the embodiments of the present invention will be described clearly and completely below in conjunction with the drawings in the embodiments of the present invention. It is obvious that the described embodiments are only part, not all, of the embodiments of the present invention. Based on the embodiments of the present invention, all other embodiments obtained by those having ordinary skills in the art without creative effort shall fall within the scope of the protection of the present invention.

Referring to FIGS. 1-6, the axial cyclone air filtration apparatus includes the pre-charge region 1 and the axial cyclone coagulation dust separation apparatus 2. The pre-charge region 1 is arranged on the air inlet side of the axial cyclone coagulation dust separation apparatus 2, so that the particles in air first pass through the pre-charge region 1 to carry positive and negative charges.

Figure 1:
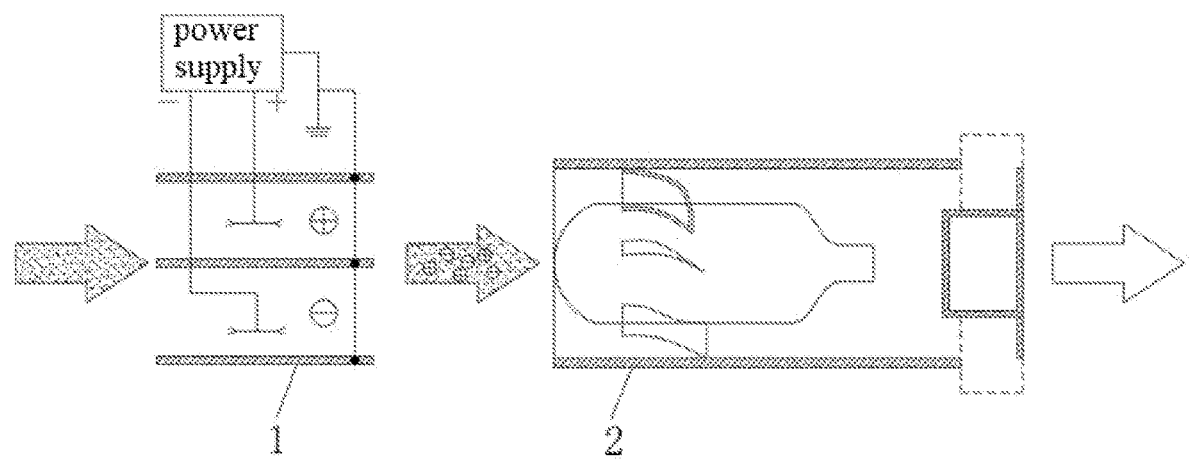
FIG. 1 is a schematic diagram of the working principle of the present invention.
Figure 2:
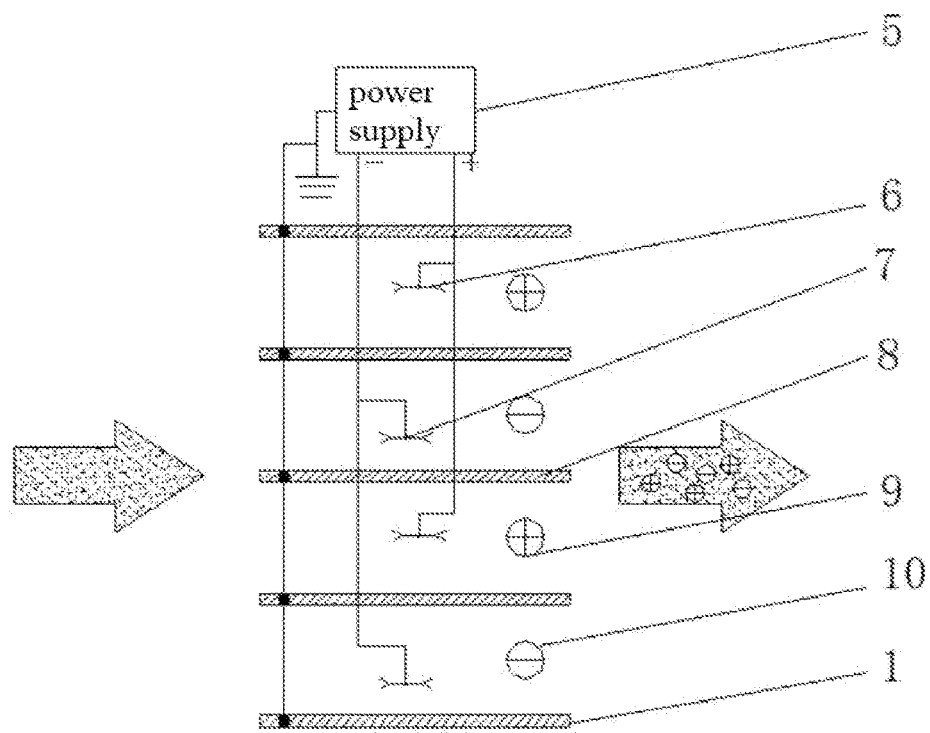
FIG. 2 is a schematic diagram of the structure and principle of the pre-charge region.
Figure 3:
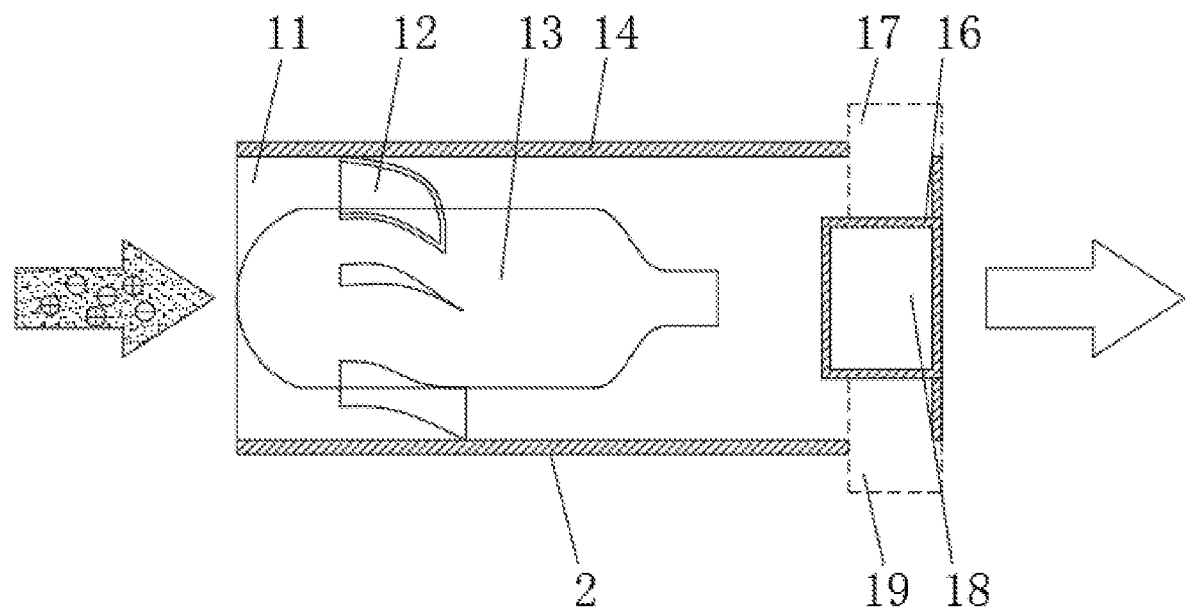
FIG. 3 is a structural schematic diagram of the axial cyclone coagulation dust separation apparatus.

The pre-charge region 1 includes a positive and negative ion generator, and the positive and negative ion generator includes the power supply 5, the positive corona electrode 6, the negative corona electrode 7 and the grounding plate 8. The positive corona electrode 6 and the negative corona electrode 7 are alternately arranged on both sides of the grounding plate 8 to form the positive corona area 9 and the negative corona area 10 adjacent to each other. When flowing through the positive corona area 9 and the negative corona area 10 adjacent to each other, particles in air are positively charged and negatively charged respectively after colliding with positive and negative ions in the electric fields. In FIG. 1, only one row of the positive corona electrodes 6 and one row of the negative corona electrodes 7 are arranged exemplarily. In practical application, multiple rows can be arranged according to the characteristics of particles and the concentration and size of dust in air to ensure that the particles in air can be fully charged when flowing through the positive corona area 9 and the negative corona area 10, and the equipment can be added adaptively as needed.

Figure 4:
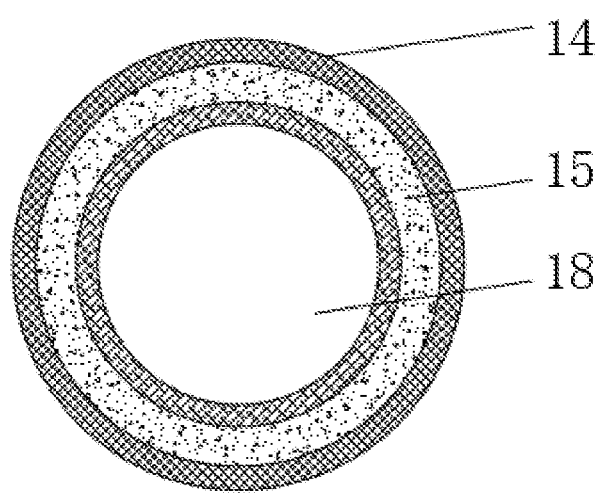
FIG. 4 is a structural schematic diagram of the cross-section of the axial cyclone coagulation dust separation apparatus.
Figure 5:
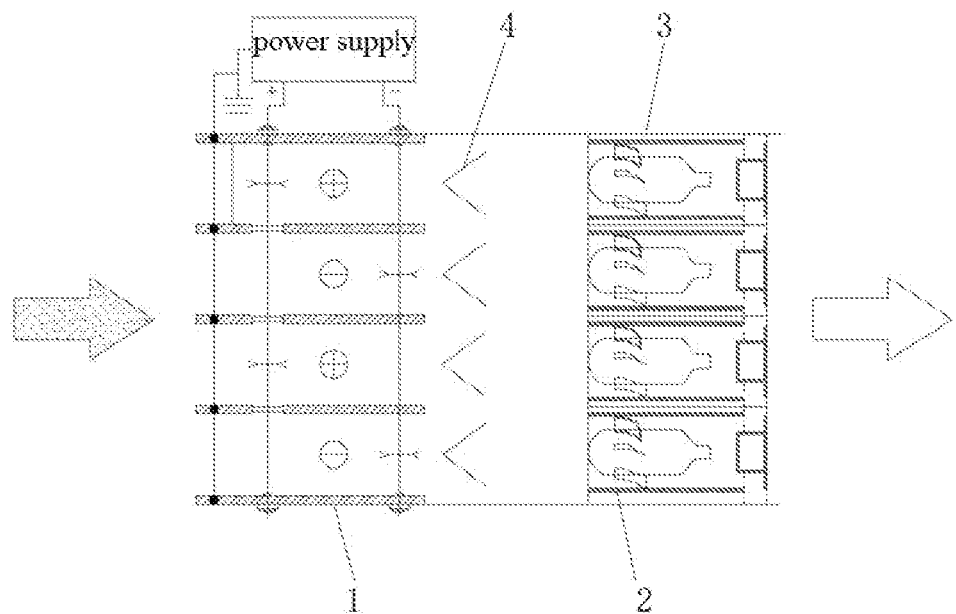
FIG. 5 is a top view of the process of the actual air-filtration system.
Figure 6:
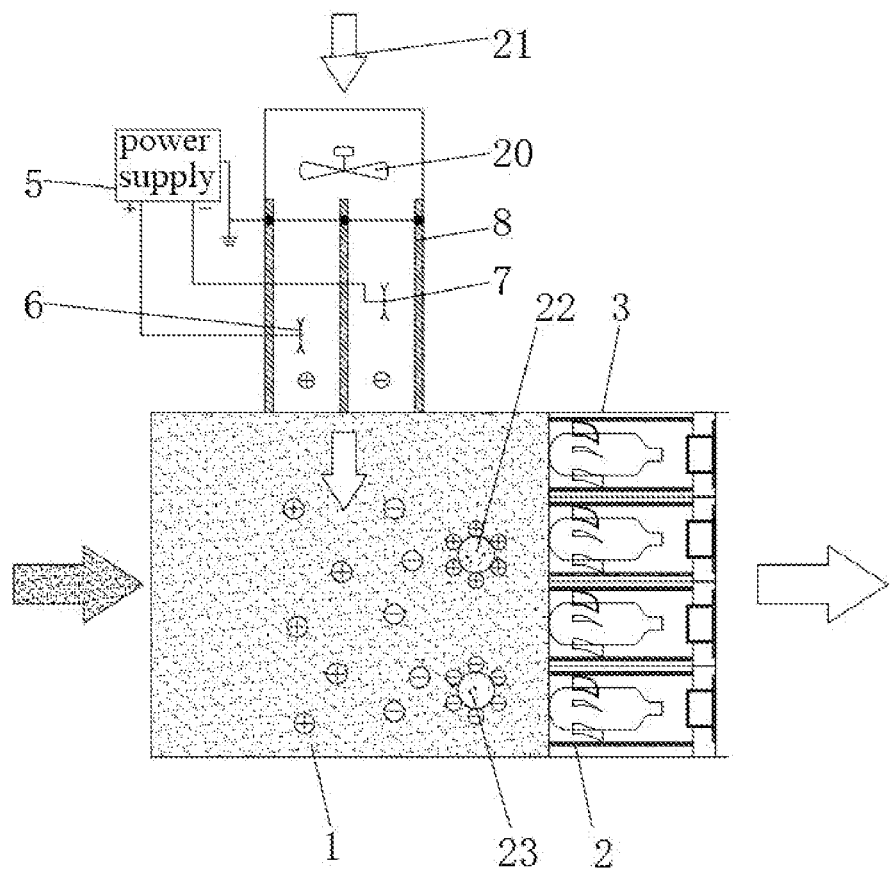
FIG. 6 is a schematic diagram of the process of another air filtration system with an external positive and negative ion generator.

The axial cyclone coagulation dust separation apparatus 2 includes the air inlet 11, the guide vane 12, the flow deflector 13, the outer cylinder 14, the air outlet 16 and the dust collection channel 19. The inner diameter of the air outlet 16 is less than the inner diameter of the outer cylinder 14. The air outlet 16 includes the inner cavity 18 of the air outlet and the outer-wall cavity 17 of the air outlet, where the outer-wall cavity 17 of the air outlet is formed by the dust collection channel 19. The inner diameter of the air outlet 16 is less than the inner diameter of the outer cylinder 14. The air outlet 16 includes the inner cavity 18 of the air outlet and the outer-wall cavity 17 of the air outlet, where the outer-wall cavity 17 of the air outlet is formed by the dust collection channel 19. FIG. 4 schematically shows that the annular dust layer 15 moving forward spirally is formed after the particles charged with charges of different polarities are agglomerated at the inner wall of the outer cylinder 14 of the axial cyclone coagulation dust separation apparatus 2.

The air flow volume of the single cylinder of the axial cyclone coagulation dust separation apparatus 2 is generally small, so the modular arrayed assembly structure can be adopted, that is, a plurality of single cylinders of the axial cyclone coagulation dust separation apparatus 2 can be modularly arrayed and assembled according to the volume of the air flow to be treated to form the axial cyclone coagulation dust separation function section 3. In order to ensure the uniform proportion of the positively charged particles and the negatively charged particles flowing into each single cylinder of the axial cyclone coagulation dust separation function section 3, the V-shaped guide plate 4 can be respectively arranged on the air outlet side of the positive corona area 9 and the air outlet side of the negative corona area 10, and various types of centralized dust collection tanks can be arranged according to the application situations, which is convenient for dust collection and treatment.

The positive and negative ion generator of the pre-charge region can be installed outside the main duct of the dusty air flow and is located on the air inlet side of the axial cyclone coagulation dust separation apparatus. For some special application situations, such as the presence of flammable and explosive gases or particles with large viscosity (such as painting mist) in dusty air flow, in order to prevent combustion and explosion accidents caused by the discharge and spark of the corona electrode, or to protect the corona electrode itself, the positive and negative ion generator of the pre-charge region 1 can be installed outside the main duct of the dusty air flow, and the positive and negative ion generator is further installed on the air inlet side of the axial cyclone coagulation dust separation apparatus 2. Under the action of the fan 20, compressed air or other external forces, the positive and negative ions produced by the positive and negative ion generator are injected into the main duct of the dusty air flow together with the indoor air 21 (such as outdoor fresh air) and collide with the particles in the dusty air flow, so that the positively charged particles (22) and the negatively charged particles (23) are formed before entering the axial cyclone coagulation dust separation apparatus (2).

Based on the above-mentioned apparatus, the experimentally comparative data are as follows:

From the above experimental data, it can be seen that the counting filtering efficiency for the particles with particle size 5.0 μm has been significantly improved after the pre-charge region is add on the air inlet side of the traditional axial cyclone separator.

In terms of the technology of the present invention, huge energy is released at the moment when positive and negative ions conduct the neutralization of the positive and negative charges in the axial cyclone dust separation apparatus, making bacterial DNA structure to break, so as to realize the role of air sterilization. In addition, TVOC such as formaldehyde/benzene/ammonia, etc. and other gaseous organic volatiles can be effective decomposed, thereby eliminating odor. Moreover, the axial cyclone air filtration method and apparatus have high separation efficiency for ultra-fine respirable suspended particles (such as particle size 5.0 μm) and large particles (such as particle size>5.0 μm), and have the advantages of maintenance-free, constant operation pressure drop and low energy consumption. Therefore, the axial cyclone air filtration method and apparatus can be widely applied in ventilation and air conditioning system, air purification system, industrial dust removal system, coal-fired boiler flue gas purification system, kitchen oil fume purification system, welding smoke purification system, painting mist purification system, and other fields.

The axial cyclone air filtration method includes the following operation steps.

Step 1: under the action of the driving force of the external fan, the dusty air flow first passes through the pre-charge region 1, and then the particles in the dusty air flow are positively charged and negatively charged respectively after colliding with positive and negative ions in the electric fields of the positive corona area 9 and the negative corona area 10 adjacent to each other, i.e., the suspended particles in the dusty air flow are bipolarly charged during the pre-charge region.

Step 2: the positively charged particles and the negatively charged particles flow into the axial cyclone coagulation dust separation apparatus 2 with air, and are mixed, compressed, collided and rotated at the air inlet 11, the guide vane 12, and the annular cavity formed by the outer cylinder 14 and the flow deflector 13 of the axial cyclone coagulation dust separation apparatus 2, so that the positively charged particles and the negatively charged particles are agglomerated into large particles under the action of centrifugal force and coulomb force.

Step 3: a large number of ultra-fine particles are adsorbed on the large particles in the coagulation process, and the agglomerated particles form the annular dust layer 15 mov- Comparison table of counting efficiency in different particle size ranges under different working conditions (according to GB/T 14295-2008)

| Classification of working conditions | Particle size range (μm) | | | | | Filtering efficiency |
|---|---|---|---|---|---|---|
| (face velocity 2.5 m/s) | 0.3-0.5 | 0.5-1.0 | 1.0-2.0 | 2.0-5.0 | 5.0-10 | level |
| Traditional axial cyclone separator | 6% | 12% | 22% | 35% | 68% | Coarse efficiency (C1) |
| Air-filtration apparatus of the present invention | 71.34% | 81.16% | 85.65% | 87.87% | 87.50% | High and moderate efficiency (GZ) | ing forward spirally along the inner wall of the outer cylinder 14 under the double action of centrifugal force and inertia force; the particles in the annular dust layer 15 are tightly bonded together due to coulomb force and electric polarization effect, and then the annular dust layer 15 moves forward under the action of the inertia force and falls into the dust collection channel 19 after hitting the tail of the outer-wall cavity 17 of the air outlet, while the clean air is discharged from the inner cavity 18 of the air outlet, thus realizing the air-filtration function. By using the above-mentioned method, since the electric coagulation function is realized inside the axial cyclone dust separation apparatus, the filtering efficiency of ultra-fine particles suspended in air can be greatly improved. For some special application situations, such as the presence of flammable and explosive gases or particles with large viscosity (such as painting mist) in the dusty air flow, in order to prevent combustion and explosion accidents caused by the discharge and spark of the corona electrode, or to protect the corona electrode itself, the positive and negative ion generator of the pre-charge region 1 can be installed outside the main duct of the dusty air flow, and the positive and negative ion generator is further installed on the air inlet side of the axial cyclone coagulation dust separation apparatus 2. Under the action of the fan 20, compressed air or other external forces, the positive and negative ions produced by the positive and negative ion generator are injected into the main duct of the dusty air flow together with the indoor air 21 (or outdoor fresh air) and collide with the particles in the dusty air flow, so that the positively charged particles 22 and the negatively charged particles 23 are formed before entering the axial cyclone coagulation dust separation apparatus 2. The particles charged with charges of different polarities, i.e., bipolar-charged particles, are agglomerated inside the axial cyclone coagulation dust separation apparatus 2 to further improve the air filtering efficiency and increase the safety when the flammable and explosive gases or particles with large viscosity are filtered.

It should be noted that in the present invention, relational terms such as first, second and the like are used only to distinguish one entity or operation from another entity or operation. without necessarily requiring or implying any such actual relationship or order between these entities or operations. Moreover, the term "include/comprise", "contain" or any other variant thereof is intended to cover non-exclusive inclusion so that a process, method, object, or device that includes a series of elements includes not only those elements, but also other elements not explicitly listed, or elements inherent in such process, method, object, or device.

Although the embodiments of the present invention have been shown and described, it should be understood for those skilled in the art that a variety of changes, modifications, replacements and variants can be made to these embodiments without departing from the principle and spirit of the present invention, and the scope of the present invention is limited by the appended claims and the equivalents thereof.

What is claimed is:

1. An axial cyclone air filtration apparatus integrated with a bipolar-charged agglomeration, comprising a pre-charge region and an axial cyclone coagulation dust separation apparatus, wherein the pre-charge region is arranged on an air inlet side of the axial cyclone coagulation dust separation apparatus, wherein the pre-charge region comprises a positive and negative ion generator, and the positive and negative ion generator comprises a power supply, a positive corona electrode, a negative corona electrode, and a grounding plate; the positive corona electrode and the negative corona electrode are alternately arranged on both sides of the grounding plate to form a positive corona area and a negative corona area; the positive corona area and the negative corona are adjacent to each other, wherein a first V-shaped guide plate is disposed on an air outlet side of the positive corona area and a second V-shaped guide plate is disposed on an air outlet side of the negative corona area, and wherein the first and second V-shaped guide plates are configured to control flows of positively charged particles from the positive corona area and of negatively charged particles from the negative corona area such that the positively charged particles flow into the axial cyclone coagulation dust separation apparatus in a proportion that is uniform with respect to a proportion of the negatively charged particles flowing into the axial cyclone coagulation dust separation apparatus together with the positively charged particles.

2. The axial cyclone air filtration apparatus integrated with the bipolar-charged agglomeration according to claim 1, wherein the axial cyclone coagulation dust separation apparatus comprises an air inlet, a guide vane, a flow deflector, an outer cylinder, an air outlet and a dust collection channel; an inner diameter of the air outlet is less than an inner diameter of the outer cylinder; the air outlet comprises an inner cavity of the air outlet and an outer-wall cavity of the air outlet, wherein the outer-wall cavity of the air outlet is formed by the dust collection channel.

3. The axial cyclone air filtration apparatus integrated with the bipolar-charged agglomeration according to claim 2, wherein a plurality of single cylinders of the axial cyclone coagulation dust separation apparatus are allowed to be modularly arrayed and assembled according to a volume of an air flow to be treated to form an axial cyclone coagulation dust separation function section.

4. An axial cyclone air filtration method integrated with the bipolar-charged agglomeration, comprising the following operation steps:

step 1: under an action of a driving force of an external fan, allowing a dusty air flow to first pass through a pre-charge region, then allowing particles in the dusty air flow to be positively charged and negatively charged respectively after colliding with positive ions in an electric field of a positive corona area and negative ions in an electric field of a negative corona area, wherein the positive corona area and the negative corona area are adjacent to each other, wherein a first V-shaped guide plate is disposed on an air outlet side of the positive corona area and a second V-shaped guide plate is disposed on an air outlet side of the negative corona area, and wherein the first and second V-shaped guide plates are configured to control flows of positively charged particles from the positive corona area and of negatively charged particles from the negative corona area such that the positively charged particles flow into an axial cyclone coagulation dust separation apparatus in a proportion that is uniform with respect to a proportion of the negatively charged particles flowing into the axial cyclone coagulation dust separation apparatus together with the positively charged particles;

step 2: allowing said positively charged particles and said negatively charged particles to flow into the axial cyclone coagulation dust separation apparatus, and to be mixed, compressed, collided and rotated at an air inlet, a guide vane, and an annular cavity formed by an outer cylinder and a flow deflector of the axial cyclone coagulation dust separation apparatus, wherein the positively charged particles and the negatively charged particles are agglomerated into large particles by a centrifugal force and a coulomb force;

step 3: allowing a large number of ultra-fine particles to be adsorbed on the large particles in a coagulation process, allowing agglomerated particles to form an annular dust layer moving forward spirally along an inner wall of the outer cylinder under a double action of the centrifugal force and an inertia force; allowing particles in the annular dust layer to be tightly bonded together due to the coulomb force and an electric polarization effect, and allowing the annular dust layer to move forward under an action of the inertia force and to fall into a dust collection channel after hitting a tail of an outer-wall cavity of an air outlet, and discharging clean air from an inner cavity of the air outlet, wherein an air-filtration function is realized; wherein when the dusty air flow contains flammable and explosive gases or particles with large viscosity, including painting mist, in order to prevent combustion and explosion accidents caused by discharge of an corona electrode and spark of the corona electrode, or to protect the corona electrode itself, a positive and negative ion generator of the pre-charge region is installed outside a main duct of the dusty air flow, and the positive and negative ion generator is further installed on an air inlet side of the axial cyclone coagulation dust separation apparatus; under an action of a fan, compressed air, or other external force, the positive ions and the negative ions produced by the positive and negative ion generator are injected into the main duct of the dusty air flow together with indoor air or outdoor fresh air, and collide with the particles in the dusty air flow, wherein the positively charged particles and the negatively charged particles are formed before entering the axial cyclone coagulation dust separation apparatus, and particles charged with charges of different polarities are agglomerated inside the axial cyclone coagulation dust separation apparatus to further improve air filtering efficiency.

* * * * *